(12) United States Patent
Amadon et al.

(10) Patent No.: US 6,608,708 B1
(45) Date of Patent: Aug. 19, 2003

(54) SYSTEM AND METHOD FOR USING A HOLOGRAPHIC OPTICAL ELEMENT IN A WIRELESS TELECOMMUNICATION SYSTEM RECEIVER

(75) Inventors: Charles Gregory Amadon, Seattle, WA (US); Richard D. Rallison, Paradise, UT (US); John J. Schuster, Bellevue, WA (US); Harold A. Brown, Renton, WA (US); Mark Pratt, Seattle, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/627,815

(22) Filed: Jul. 28, 2000

(51) Int. Cl.7 .................................................. G03H 1/00
(52) U.S. Cl. ............................ 359/15; 359/19; 359/152
(58) Field of Search ............................... 359/15, 16, 19, 359/152, 159, 163; 385/24

(56) References Cited

U.S. PATENT DOCUMENTS

| | | | | |
|---|---|---|---|---|
| 3,492,484 A | | 1/1970 | Ito | |
| 3,824,597 A | | 7/1974 | Berg | |
| 4,329,409 A | * | 5/1982 | Wreede et al. ................. | 430/1 |
| 4,490,981 A | * | 1/1985 | Meckler ....................... | 359/15 |
| 5,095,375 A | * | 3/1992 | Bolt ............................... | 359/1 |
| 5,255,065 A | * | 10/1993 | Schwemmer ................. | 359/17 |
| 5,517,339 A | * | 5/1996 | Riccobono et al. ........... | 359/15 |
| 5,757,523 A | * | 5/1998 | Wood et al. .................. | 359/15 |
| 5,798,580 A | * | 8/1998 | Morozov et al. ........... | 307/112 |
| 2002/0031295 A1 | * | 3/2002 | Sasaki .......................... | 385/24 |
| 2002/0089709 A1 | * | 7/2002 | Mays .......................... | 359/15 |

* cited by examiner

Primary Examiner—John Juba
Assistant Examiner—Fayez Assaf
(74) Attorney, Agent, or Firm—Blakely Sokoloff Taylor & Zafman LLP

(57) ABSTRACT

A holographic optical element (HOE) device is mounted in a receiver unit, such as a wireless optical telecommunication system receiver. The HOE device includes a developed emulsion material having an interference pattern recorded thereon, sandwiched between a pair of elements, such as a pair of clear glass plates. In operation, the HOE device uses the recorded interference pattern to diffract incident light rays towards an optical processing unit of the system receiver. The optical processing unit includes a photodetector that detects the diffracted light rays. The system receiver can include various other components and/or can have various configurations. In one configuration, a plurality of mirrors is used to control the direction of the light rays coming from the HOE device, and a collimating optical assembly collimates these light rays. A beam splitting optical assembly can be used to split the light rays into a tracking channel and a communication channel.

31 Claims, 6 Drawing Sheets

SYSTEM AND METHOD FOR USING A HOLOGRAPHIC OPTICAL ELEMENT IN A WIRELESS TELECOMMUNICATION SYSTEM RECEIVER

BACKGROUND OF THE INVENTION

1. Field of the Invention

The present invention relates generally to wireless telecommunication systems, and in particular relates to the use of a holographic optical element (HOE) device in an optical wireless telecommunication system receiver.

2. Background Information

At a basic level, a typical optical wireless telecommunications system comprises an optical transmitter and an optical receiver, with associated electronics to modulate and demodulate data on a light beam. Often, receivers are basically telescopes.

Figure 1:
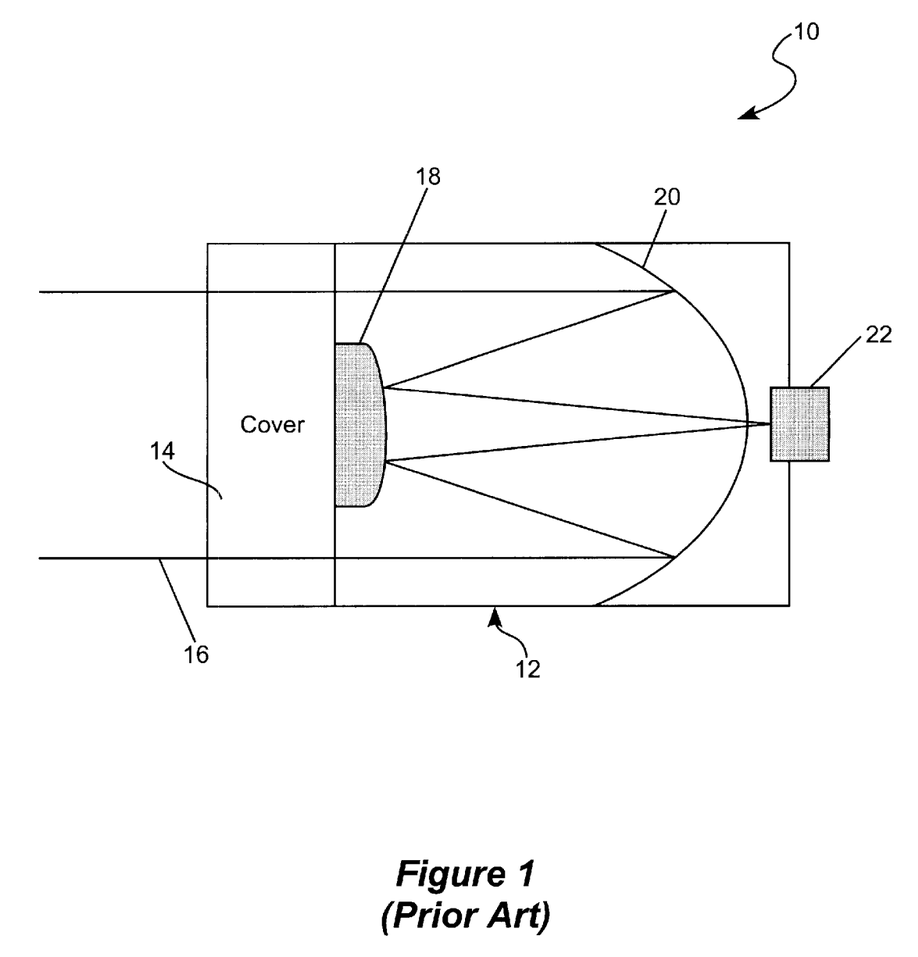
FIG. 1 is a functional block diagram showing a prior art optical receiver system.

An example of a configuration of a typical receiver system is shown at 10 in FIG. 1. The system 10 comprises a cylindrical receiver tube 12 with a lens and cover 14 (typically made of glass) at one end, and system of internal mirrors to collect and focus light to a single receiving point. In this system 10, a light beam 16 enters the receiver tube 12, and is collected using internal mirrors, including a mirror 18 and a spherical mirror 20. Finally, the mirrors 18 and 20 focus the light beam 16 onto the single receiving point at a photodetector 22. An example of such a traditional system is a Cassegrain telescope with detector electronics replacing the eyepiece.

The various optics and components for the system 10 are heavy, fragile, bulky, difficult to manufacture with consistent quality, and expensive. Because optical communications systems are capable of much higher data rates than traditional radio frequency (RF) systems, the ability to make stable and inexpensive systems is becoming more and more desirable.

SUMMARY OF THE INVENTION

According to an aspect of the invention, a system includes a holographic optical element (HOE) device. The HOE device has a first element having first and second surfaces, with the first surface being positionable to face incident light rays. An emulsion material having an interference pattern recorded thereon is disposed over the second surface of the first element. A second element has a first surface disposed over the emulsion material, and is structured to pass resulting light rays, derived from the incident light rays diffracted by the interference pattern, in a direction towards a location facing a second surface of the second element. An optical processing unit receives the resulting light rays.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a system and method for using a holographic optical element (HOE) device in a wireless telecommunication system receiver are described in detail herein. In the following description, numerous specific details are provided, such as the description of various receiver system components in FIGS. 5–6, to provide a thorough understanding of embodiments of the invention. One skilled in the relevant art will recognize, however, that the invention can be practiced without one or more of the specific details, or with other methods, materials, components, etc. In other instances, well-known structures, materials, or operations are not shown or described in detail to avoid obscuring aspects of various embodiments of the invention. Furthermore, it is understood that the various embodiments shown in the figures are illustrative representations, and are not necessarily drawn to scale.

Reference throughout this specification to "one embodiment" or "an embodiment" means that a particular feature, structure, material, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, materials, or characteristics may be combined in any suitable manner in one or more embodiments.

Figure 2:
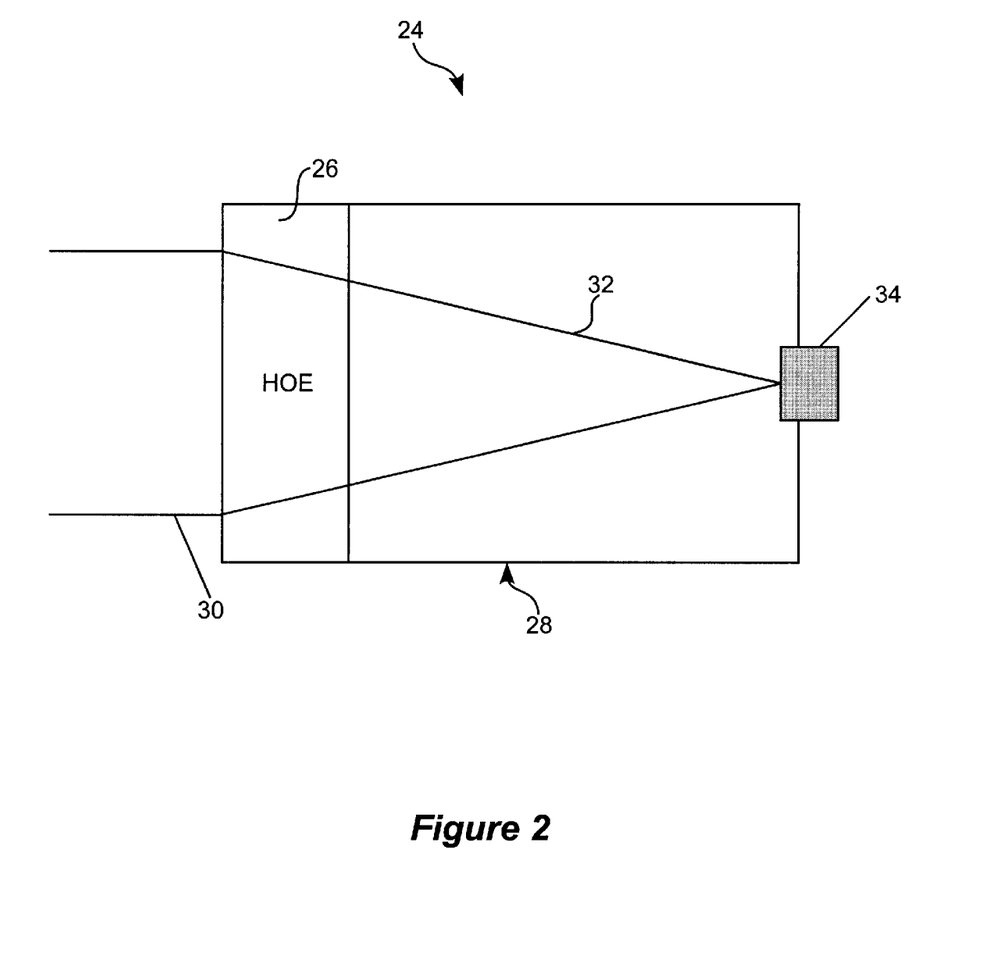
FIG. 2 is a functional block diagram showing a holographic optical element (HOE) device in a receiver system according to an embodiment of the invention.

Referring first to FIG. 2, shown generally at 24 is an embodiment of a receiver system having a HOE device 26 disposed in a cylindrical tube 28. The receiver system 24 replaces traditional optical receiver elements, such as those shown in FIG. 1, with the HOE device 26. At a basic level, the HOE device 26 performs most or all of the light collection operations for incident light rays 30, and focuses resulting light rays 32 onto a detection unit 34.

In operation, the incident light rays 30 can comprise all or part of a light signal sent from an optical transmitter system (not shown), having data modulated thereon. According to an embodiment, the incident light rays 30 can comprise laser light and the like, having a wavelength of 1548.51 nm, for example. The incident light rays 30 are not limited to being monochromatic or to any particular wavelength or color, and may include visible light as well as ultraviolet or infrared portions of the spectrum.

The detection unit 34 can form part of an optical processing unit that includes photodetectors (such as avalanche photodiodes, PIN detectors, or other such detectors or photosensitive devices, for example), processors, modulators/demodulators, and other electronic logic and electronic circuitry to extract and process the data from the resulting light rays 32. According to the embodiment shown in FIG. 2, the HOE device 26 can focus the resulting light rays 32 to a spot at the detection unit 34.

According to an embodiment of the invention, the HOE device 26 comprises a hologram, which is made by recording interference fringe fields (e.g., an interference pattern) from two light signals (such as lasers), in a photoresist material (e.g., an emulsion material), and then developing the photoresist material. Embodiments of methods to manufacture HOE devices having recorded interference patterns are disclosed in "METHOD AND APPARATUS FOR CORRECTING ABERRATIONS IN PHOTON COLLECTION DEVICES," U.S. Pat. No. 6,381,044, issued Apr. 30, 2002 (filed Jul. 28, 2000), assigned to the same assignee as the present application, and incorporated by reference. This co-pending patent application further discloses an apparatus/method of correcting aberrations with the use of aspheric components.

Figure 3:
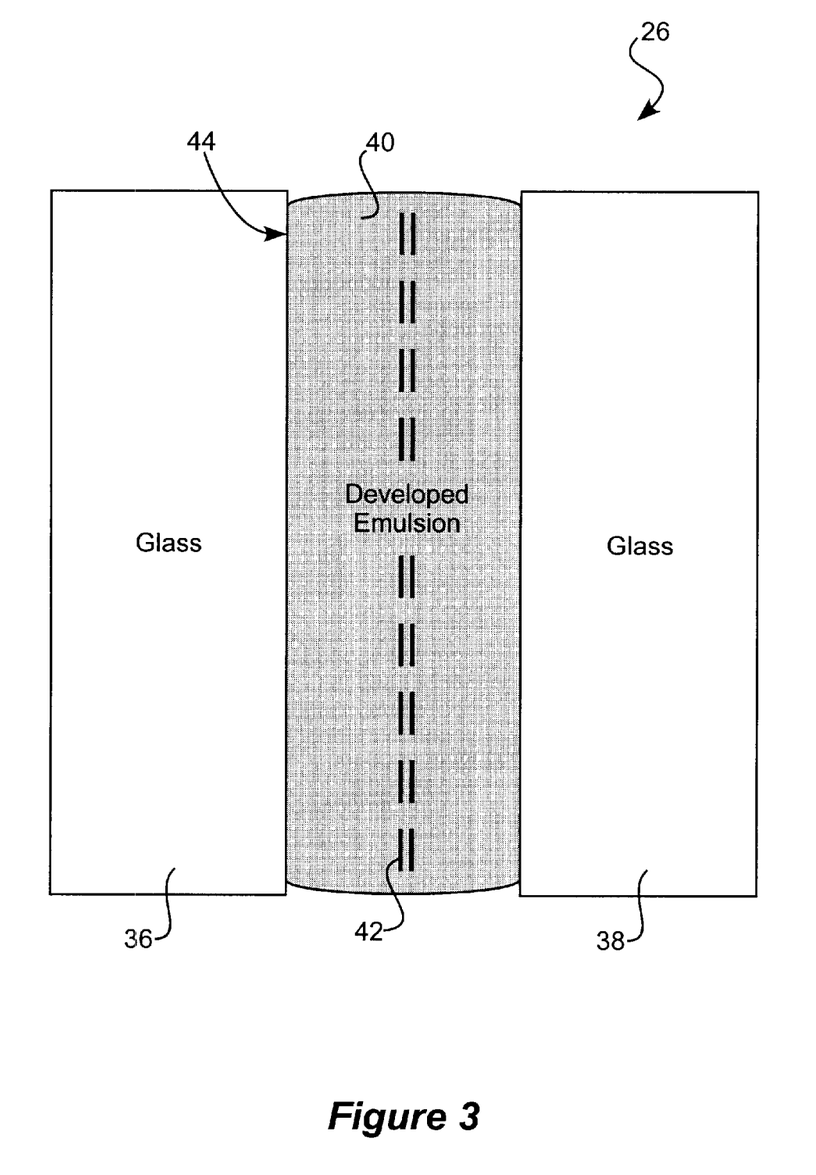
FIG. 3 illustrates an embodiment of a HOE device that can be used in the receiver system of FIG. 2.

As shown in FIG. 3, the HOE device 26 in one embodiment comprises a first element 36 and a second element 38, with both elements sandwiching a developed emulsion material 40 having an interference pattern 42 recorded thereon. During a recording process, such as that described in the copending application identified above, the emulsion material 40 is first deposited over a surface 44 of the first element 36, and then exposed to interfering light signals to obtain the interference pattern 42. Subsequently, the second element 38 is affixed or mated over the developed emulsion material 40, to provide a seal to protect the emulsion material 40 from environmental contaminants, such as moisture. Thereafter, an anti-reflective coating may be applied to one or more of the exposed surfaces of the HOE device 26. Application of the anti-reflective coating(s) may also be done before affixing the second element 38 over the developed emulsion material 40.

According to one embodiment, the first element 36 and the second element 38 comprise plates of glass having flat surfaces, although other types of materials, such as molded plastic, may be used in other embodiments. The first element 36 and the second element 38 can have a diameter of 16 inches and a thickness of 0.236 inches, for example. A person skilled in the art will recognize that these dimensions may vary or may be scaled based on various criteria and optical factors, such as type of material used, type of application, coefficient of thermal expansion, index of refraction, index of dispersion, etc. An illustrative HOE device 26 used for the receiver system 24 may use standard BK-7 glass for the first element 36 and for the second element 38, with the BK-7 glass having known physical and optical properties. The materials used for the first element 36 and for the second element 38 can have an index of refraction of approximately 1.5, for example. Consequently, the invention is not necessarily limited by specific physical dimensions or by specific physical or optical properties of the first element 36 and second element 38.

According to an embodiment, the HOE device 26 may utilize a dichromated gelatin for the emulsion material 40, though photopolymers that provide a high level of diffraction efficiency for the intended purposes, or can otherwise perform adequately for specific wavelengths, may also be used. A suitable type of gelatin, which can be mixed with dichromate according to ratios known by those skilled in the art, is designed by Ralcon Development Lab, located at Paradise City, Utah, and manufactured by Kind & Knox Gelantine, Inc., located at Sioux City, Iowa, under their Gelita™ line of optical gelatins, Type 7644, Lot 2. In another embodiment, the emulsion material 40 may be made from a homogenized mixture of gelatin and silver halides, such as those mixtures that are commercially available for optical applications.

Surfaces of the first element 36 and second element 38 are typically made as smooth as possible, to avoid introduction of unacceptable aberrations during a playback process. Additionally, the material making up the first element 36 and second element 38 should be transparent, so as to reduce scattering effects and/or to improve the incident light rays' 30 transmission efficiency.

An embodiment of the HOE device 26 uses a recorded volume phase hologram (e.g., the interference pattern 42) that causes light rays passing through the HOE device 26, during the playback process (e.g., during reception of incident light rays 30), to substantially focus at a location facing the exposed surface of the second element 38 (e.g., to focus at a spot on the detection unit 34). Stated in another way, during the playback when the incident light rays 30 (at a wavelength of 1548.51 nm in one embodiment) are received at the HOE device 26, the incident light rays 30 pass through the first element 36 to the interference pattern 42. The interference pattern 42 diffracts the incident light rays 30 into the second element 38 and on towards the detection unit 34.

The index of refraction in the volume phase hologram varies sinusoidally over the aperture. The sinusoidal frequency increases with increasing aperture. The sinusoidal pattern is obtained by construction optics during the recording process, and establishes the focal length f of the HOE device 26, where the focal length f is the distance along an optical axis of the HOE device 26 for an on-axis receiver system 74, measured from approximately the interference pattern 42 to the spot on the detection unit 34 where the resulting light rays 32 focus. The focal length f of the HOE device 26 may be, in general terms, determined by the following equation:

$$f = \left[q\frac{\lambda_c}{\lambda_0}\left(\frac{1}{R_0} - \frac{1}{R_r}\right)\right]$$

Figure 4:
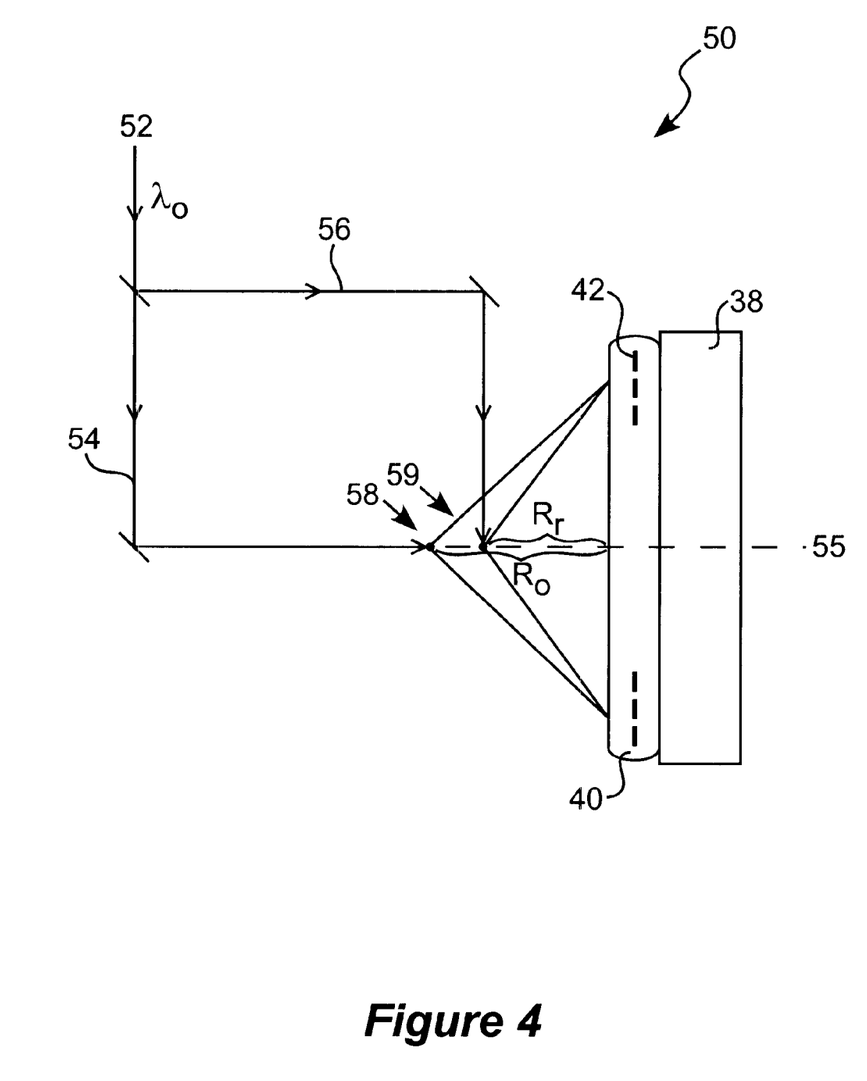
FIG. 4 is diagram illustrating parameters used in construction optics for the HOE device of FIG. 2.

$q$ = diffracted order $\lambda_c$ = playback wavelength $\lambda_0$ = construction wavelength $R_0$ = distance from from HOE to first construction point $R_r$ = distance from from HOE to second construction point FIG. 4 illustrates the relationship of the various parameters in this equation. In FIG. 4, an embodiment of a recording process 50 is illustrated, where a light 52 (at a construction wavelength $\lambda_0$, which can be 488 nm in one embodiment) is split into two paths 54 and 56. From a first construction point 58 and from a second construction point 59, the two light paths 54 and 56, respectively, are expanded onto the surface of the emulsion material 40, thereby exposing the emulsion material 40 to the two interfering light paths 54 and 56. The recorded interference pattern 42 on the emulsion material 40 results.

In FIG. 4, the distance $R_0$ is the distance from the first construction point 58 to the emulsion material 40 along an optical axis 55, and the distance $R_r$ is the distance from the second construction point 59 to the emulsion material 40 along the optical axis 55. In the above equation, the diffracted order q can be ±1 for first order, and the playback wavelength $\lambda_c$, can be 1548.51 nm in one embodiment. The light entering the HOE device 26 is thus diffracted during playback and focused to a point behind the HOE device, depending on this focal length f. In an embodiment, the HOE device 26 has an f-number of f1 (e.g., a one-to-one ratio between the focal length f and the diameter/aperture of the volume phase hologram). This f-number may be manipulated by varying the construction optics.

Figure 5:
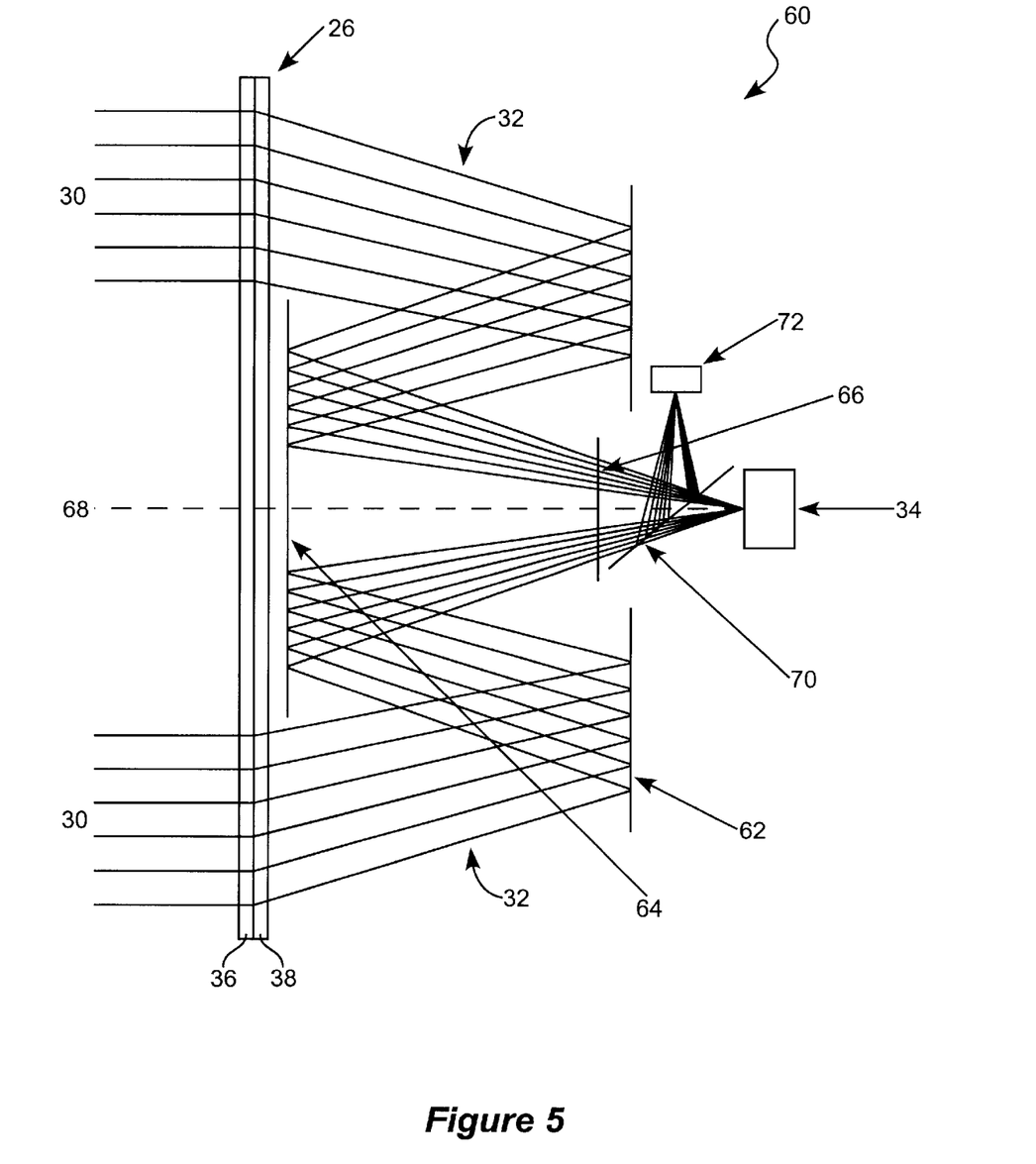
FIG. 5 is a functional block diagram showing the HOE device of FIG. 3 in a receiver system according to another embodiment of the invention.
Figure 6:
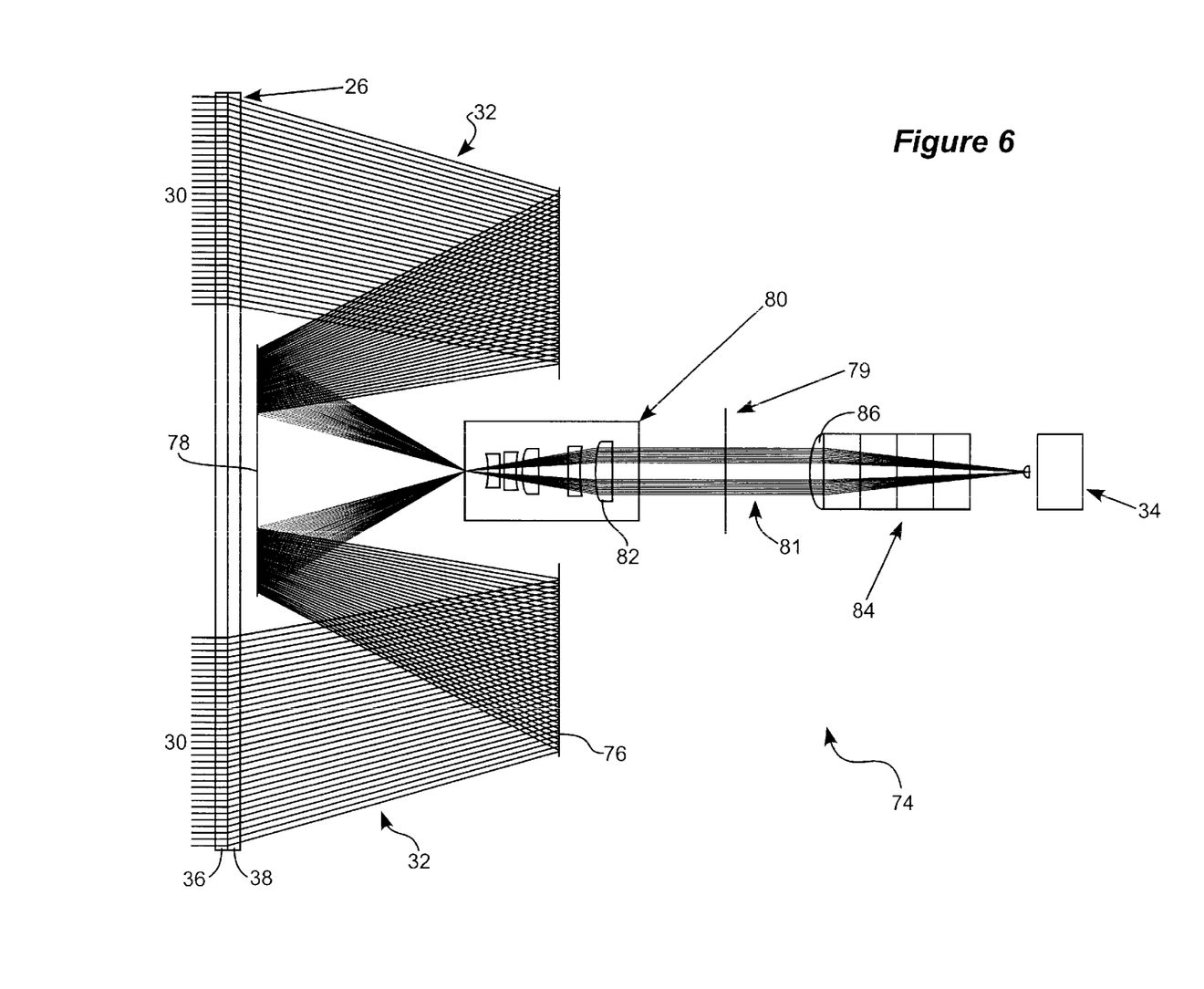
FIG. 6 is a functional block diagram showing the HOE device of FIG. 3 in a receiver system according to another embodiment of the invention.

Embodiments of the invention may be implemented using various configurations. For example, FIG. 5 shows an embodiment of a "direct-to-focus" configuration, and FIG. 6 shows an embodiment of a "collimated" configuration. The collimated configuration has advantages in that it allows for the easy insertion of beam splitters for purposes of tracking, quality control, etc.

Referring first to FIG. 5, shown generally at 60 is an embodiment of a receiver system having a direct-to-focus configuration. The receiver system 60 includes the HOE device 26 located at the front-end of the receiver system 60, such that the first element 36 faces the incident light rays 30 and resulting light rays 32 are passed from the second element 38. The receiver system 60 can also include a plurality of flat mirrors 62 and 64, and a steering mirror 66, to control the direction of the resulting light rays 32, and can further include various detector electronics to process the resulting light rays 32. All of the optical power (e.g., focusing ability) comes from the HOE device 26.

The flat mirrors 62 and 64 are used to decrease packaging size by folding the resulting light rays 32 on themselves. That is, the resulting light rays 32 are first reflected from the flat mirror(s) 62, towards the flat mirror(s) 64. The flat mirror(s) 64 then reflects the resulting light rays 32 towards the steering mirror 66. In this manner, an overall focal length of the receiver system 60 is reduced.

The steering mirror 66 is used to keep the image focused (e.g., focuses the resulting light rays 32) on the detection unit 34. In this manner, the steering mirror 66 is used to compensate for high frequency movement caused by building sway or vibration upon the receiver system 60. The steering mirror 66 may be oriented at a 450° angle relative to the incident light rays 30 or relative to an optical axis 68 of the HOE device 26. Consequently, the detection unit 34 may be positioned 90° relative to the optical axis 68. For the sake of clarity, this positioning/angle is not shown in FIG. 5.

A beam splitter 70 positioned behind the steering mirror 66 may be used to pick off a portion of the input beam (e.g., a portion of the resulting light rays 32) and direct it onto a quadrant cell optical detector 72. A resulting spot on the quadrant cell optical detector 72 is indicative of the input beam's relative input angle. This input angle may then be used to keep the receiver system 60 "tracking" to the transmitter system (not shown) that transmits the incident light rays 30 at various ranges by adjusting the angle of the steering mirror 66.

The detection unit 34 can include an avalanche photo diode having a high gain and increased sensitivity. This is a type of detector that is typically used for communications, though any suitable optical signal detector can be used as well. For example, a PIN detector may be used.

An embodiment of a receiver system 74 having a collimated configuration is shown in FIG. 6. Similar to the direct-to-focus configuration shown in FIG. 5, the collimated configuration of the receiver system 74 of FIG. 6 also uses the HOE device 26 at the front end, a plurality of flat mirrors 76 and 78 to fold the resulting light rays 32 on themselves, and a steering mirror 79 to control the direction of the resulting light rays 32. Again, the steering mirror 79 and/or detection unit 34 may be oriented at different angles/positions relative to the optical axis, and such orientation is not shown in FIG. 6 for simplicity of illustration and explanation. The receiver system 74 includes other components for ease of implementation of various features for communications.

For example, a collimating optical assembly 80 receives the reflected resulting light rays 32 from the flat mirror 78 and re-collimates them into collimated light rays 81. In one embodiment, the collimating optical assembly 80 comprises a series of lenses that perform aberration correction, focusing, and collimating of the resulting light rays 32. The HOE device 26 and collimating optical assembly 80 act as an afocal telescope, where light rays are collimated in and collimated out. This configuration is somewhat similar to that of binoculars and astronomical telescopes, where the HOE device 26 functions as an objective and the collimating optical assembly 80 functions as an eyepiece.

A last element 82, such as a lens, in the collimating optical assembly 80 may be moved longitudinally to refocus the receiver system 74 for different link ranges from a transmitter system (not shown). In this manner, the receiver system 74 can be adjusted to optimize reception of light from a transmitter system (not shown) located at specific distances. The collimated path of the collimated light rays 81 gives the receiver system 74 several distinct characteristics, including:

1. Reduction of tolerances for optics downstream of the HOE device 26.
2. Reduction of costs for the system receiver 74.
3. Use of beam splitters (not shown) along the collimated path allows for multiple channels.
4. Plate beam splitters used in divergent light introduce astigmatism and therefore increases spot size, while a beam splitter in a collimated path induces no astigmatism The receiver system 74 may include a beam splitting optical assembly 84. The beam splitting optical assembly 84 can comprise a module that has one or more components that are used to split, from the collimated light rays 81, the communication channel from the tracking channel, while using a common focusing lens 86. The light rays of the communication channel may then be focused or directed to the detection unit 34. According to one embodiment, the beam splitting optical assembly 84 can comprise a module including the lens 86, a beam splitter, and a mirror.

In summary, the HOE device 26, having a volume phase hologram or interference pattern 42 recorded thereon, may be used in a receiver system to receive incident light rays 30 and to substantially focus resulting light rays 32 in a direction towards a location facing the HOE device 26. Such a location may be a spot at the detection unit 34, although various mirrors, beam splitters, collimating optical assemblies, beam splitting optical assemblies, etc. may be used to control and manipulate the resulting light rays before they reach the detection unit 34. The HOE device 26 can comprise the emulsion material 40 that is sandwiched between the first element 36 and the second element 38, with the emulsion material 40 being developed and processed to include the interference pattern 42, such as a volume phase hologram.

Use of the HOE device 26 in the various embodiments described herein provides several advantages over traditional receiver optics. First, due to the nature of the HOE device 26, it has the capability of collecting only one frequency of light. Therefore, all of the optical power is dedicated to collecting the transmission beam (e.g., the incident light rays 30), and optical interference is unlikely. Traditional systems, like the system 10 of FIG. 1, are less efficient, as the mirrors 18 and 20 collect all of the light, regardless of frequency, thereby resulting in possible interference due to background light.

Another major advantage of embodiments of the invention is cost. Traditional optics utilize expensive spherical mirrors, such as the spherical mirror 20. Furthermore, each mirror in prior art systems will be slightly different, due to manufacturing techniques. HOE devices 26 of the present invention are inexpensive to produce, and are relatively easy to reproduce to exact specifications. Therefore, the quality level is much higher at a much lower cost.

Furthermore, incorporating the HOE device 26 in the receiver system, such as in the receiver system 24, will result in a less bulky unit. The HOE device 26 can be manufactured to have an f-number of f1, while traditional optics cannot as easily be manipulated this way, and have f-numbers more on the order of f3 to f5 for similar aperture size (e.g., longer focal lengths f for the same aperture size). Therefore, receiver systems such as the receiver systems 24, 60, and 74 will be of less overall length, which is a major advantage for mass-produced commercial wireless optical telecommunication systems.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, while some embodiments of the receiver system have been described as using mirrors and/or beam splitters having specific orientations, it is understood that other embodiments may not include these components or that other embodiments may have other configurations or orientations.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An optical wireless telecommunications system receiver, comprising:
    a holographic optical element (HOE) device including:
    a first element having first and second surfaces, the first surface being positionable to receive incident light comprising an optical signal having data modulated thereon transmitted from a remote optical transmitter,
    an emulsion material disposed on the second surface of the first element and having a recorded interference pattern to diffract portions of received light having said one or more predetermined wavelengths;
    a second element having a first surface disposed on the emulsion material, the second element being structured to pass resulting light, derived from the incident light diffracted by the recorded interference pattern, in a direction toward a location facing a second surface of the second element; and
    an optical processing unit including a detector positioned to receive the resulting light and electronics to demodulate an output of the detector to extract the data modulated thereon.

2. The system of claim 1 wherein the first and second elements comprise a glass material and wherein the emulsion material comprises a dichromated gelatin material.

3. The system of claim 1 wherein the optical processing unit includes a photodetector comprising an avalanche photo diode or a PIN detector to convert the received resulting light into electronic signals.

4. The system of claim 1 wherein the location facing the second surface of the second element comprises a location along an optical axis of the HOE device.

5. The system of claim 1, further comprising a plurality of mirrors positionable between the HOE device and the optical processing unit, the plurality of mirrors being capable of reducing an overall focal length of the HOE device by controlling a direction of the resulting light passed from the second element of the HOE device.

6. The system of claim 1, further comprising a steering mirror positionable between the HOE device and the optical processing unit, the steering mirror being capable of substantially keeping the resulting light focused towards the optical processing unit in response to movement of the HOE device.

7. The system of claim 1, further comprising:
    an optical detector; and
    a beam splitter to direct a first portion of the resulting light associated with a tracking operation towards the optical detector and to direct a second portion of the resulting light having data modulated thereon towards the optical processing unit.

8. The system of claim 1, further comprising:
    a collimating optical assembly positionable between the HOE device and the optical processing unit to collimate the resulting light; and
    an optical element positionable between the collimating optical assembly and the optical processing unit to separate, from the collimated resulting light, a tracking channel and a communication channel, and to direct the communication channel towards the optical processing unit.

9. The system of claim 8 wherein the optical element comprises a beam splitting optical assembly.

10. The system of claim 8 wherein the collimating optical assembly includes a refocusing element to longitudinally refocus the collimated resulting light.

11. The system of claim 8 wherein the optical processing unit includes a PIN detector or a photodiode to convert the received resulting light into electronic signals.

12. The system of claim 1 wherein the recorded interference pattern comprises a volume phase hologram.

13. The system of claim 1 wherein the emulsion material comprises a photopolymer material.

14. The system of claim 1, wherein the second surface of the first element and the first surface of the second element are smooth.

15. An apparatus, comprising:
    a holographic optical element (HOE) device disposed in a receiver unit of an optical wireless telecommunications system designed to receive an optical signal having a data stream modulated thereon from an optical transmitter, the HOE device including a recorded interference pattern on an emulsion material designed to diffract light at one or more predetermined wavelengths corresponding to the optical signal, the HOE device being positionable to face incident light and to pass a portion of the incident light having said one or more predetermined wavelengths as resulting light diffracted by the recorded interference pattern, said apparatus further including electronics for extracting the data stream from the resulting light.

16. The apparatus of claim 15 wherein the recorded interference pattern comprises a volume phase hologram.

17. The apparatus of claim 15 wherein the receiver unit includes:

an optical processing unit to receive the resulting light; and a plurality of mirrors between the optical processing unit and the HOE device to control a direction of the resulting light from the HOE device to the optical processing unit.

18. The apparatus of claim 15, further comprising:

a collimating optical assembly positionable between the HOE device and an optical processing unit to collimate the resulting light; and an optical element positionable between the collimating optical assembly and the optical processing unit to separate, from the collimated resulting light, a tracking channel and a communication channel, and to direct the communication channel towards the optical processing unit.

19. The apparatus of claim 18, further comprising a beam splitter positionable to receive the collimated resulting light from the collimating optical assembly and to split the collimated resulting light into a plurality of communication channels.

20. The apparatus of claim 15 wherein the HOE device comprises a pair of glass elements sandwiching a developed emulsion material, the developed emulsion material including the recorded interference pattern.

21. A method, comprising:

positioning a holographic optical element (HOE) having an interference pattern recorded on an emulsion material to receive an optical signal having a data stream modulated thereon from an optical transmitter;

using the recorded interference pattern in the HOE device to diffract light having a wavelength corresponding to the optical signal; and detecting the diffracted light and obtaining data corresponding to the data stream.

22. The method of claim 21, further comprising altering a direction of the resulting light to reduce an overall focal length of the HOE device.

23. The method of claim 21, further comprising:

collimating the resulting light; and splitting the collimated light into a communication channel and a tracking channel.

24. The method of claim 21, further comprising:

using a beam splitter to direct a portion of the resulting light associated with tracking to an optical detector for tracking; and using the beam splitter to direct another portion of the resulting light associated with communication data to an optical processing unit.

25. The method of claim 21, wherein the recorded interference pattern disposed on an emulsion material between a pair of elements, the pair of elements having smooth surfaces.

26. A method, comprising:

recording an interference pattern on an emulsion material;

placing the emulsion material between a pair of elements to form a holographic optical element (HOE) device; and mounting the HOE device in a receiver unit of an optical wireless telecommunications system to receive and demodulate data modulated on a light signal sent from an optical transmitter located remotely from the receiver unit.

27. The method of claim 26 wherein the pair of elements comprises a pair of glass plates.

28. The method of claim 26 wherein recording the interference pattern on the emulsion material comprises:

splitting a light into first and second paths;

expanding light from the first path from a first point towards the emulsion material;

expanding light from the second path from a second point towards the emulsion material; and obtaining the interference pattern at the emulsion material from an interference of the lights expanded from the first and second points.

29. The method of claim 26, further comprising mounting a plurality of mirrors in the receiver unit to control a direction of light passing through the HOE device.

30. The method of claim 26 wherein the pair of elements is made from a plastic material.

31. The method of claim 26, wherein the pair of elements having smooth surfaces.

* * * * *

UNITED STATES PATENT AND TRADEMARK OFFICE
CERTIFICATE OF CORRECTION

PATENT NO. : 6,608,708 B1
DATED : August 19, 2003
INVENTOR(S) : Amadon et al.

It is certified that error appears in the above-identified patent and that said Letters Patent is hereby corrected as shown below:

<u>Column 9,</u>
Line 21, after the phrase "a pair of" please insert -- smooth --.

Signed and Sealed this

Eighteenth Day of May, 2004

JON W. DUDAS
*Acting Director of the United States Patent and Trademark Office*